Nov. 15, 1960  W. A. DERINGER  2,959,850
METHOD OF WELDING GLASS-LINED VESSELS
Filed July 28, 1955

INVENTOR.
Wayne A. Deringer
BY Andrus & Sceales
ATTORNEYS.

United States Patent Office 2,959,850
Patented Nov. 15, 1960

2,959,850

METHOD OF WELDING GLASS-LINED VESSELS

Wayne A. Deringer, Shorewood, Wis., assignor to A. O. Smith Corporation, Milwaukee, Wis., a corporation of New York Filed July 28, 1955, Ser. No. 524,922

5 Claims. (Cl. 29—458)

This invention relates to a method of welding glass-lined vessels, and more particularly to an improved method of welding heads to a cylindrical tank to form the basic unit of a hot water heater.

Heretofore, in the manufacture of ceramic or glass-lined water heater tanks, it has been difficult to insure complete glass coverage of the interior of the tank, especially adjacent the circumferential weld seams between the cylindrical and head portions of the vessel. This has produced a serious problem for the water heater manufacturer, for in order to minimize corrosion of the metal tank, the inner metal surface of the tank should be completely covered by the glass coating. If any minute area becomes exposed to the corrosive effects of water, the life of the water heater may be shortened.

One method of manufacturing glass-lined tanks has been to weld the top and bottom heads to the cylindrical tank portion prior to applying the lining. Subsequently, the glass material is introduced into the tank through a suitable opening and the tank revolved so that the interior is covered with the material. The tank is then fired to bond the lining thereon.

The difficulty with the above described method has been that there is no completely satisfactory means to inspect the interior of the vessel after firing in order to detect the presence of flaws in the glass coating.

A second manufacturing method has been to apply the coating to the vessel components and to fire them prior to welding. This method allows for adequate inspection for flaws. However, in welding the heads to the tank after coating, serious defects have often been found in the completed vessel. These defects take the form of numerous cracks in the ceramic or glass which are transverse to the welded seam. It is believed that the cracks are the result of stresses formed between the ceramic and bare metal due to the heat of welding. Previously, no suitable means has been found to consistently eliminate cracking of the lining at the welding seam.

The present invention substantially solves the problem of cracking, and produces a lined vessel which may be thoroughly inspected after coating, and which will be sealed against corrosion. According to the invention, the area to be welded is heated prior to welding but after the enamel or glass has been applied. This has been found to relieve any cracking of the glass during welding and to produce a smooth sealed inner seam. The welding step is performed on the heated area and while the latter is at substantially the preheated temperature.

The accompanying drawing illustrates the best mode presently contemplated by the inventor for carrying out the invention.

Figure 1:
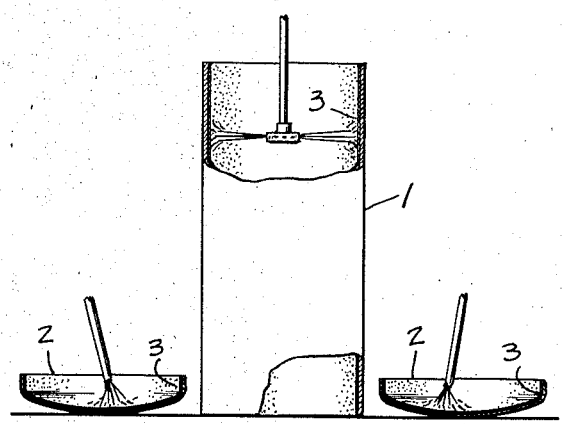
Figure 1 is a side elevation of the tank components during the application of the glass lining, and with parts broken away.
Figure 2:
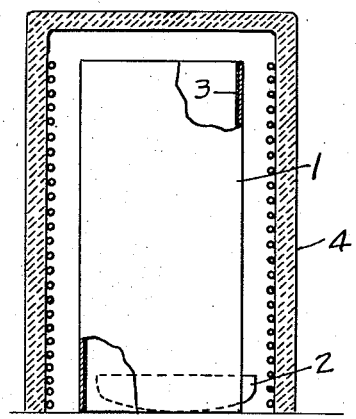
Fig. 2 is a transverse section through a furnace showing the firing operation.
Figure 3:
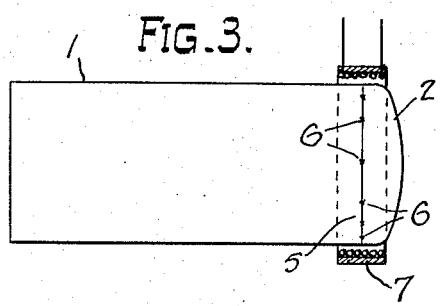
Fig. 3 is a side elevation showing one head tack welded to the vessel and preheating of the seam prior to final welding.

As shown in the drawing, the method of the invention may be employed in the manufacture of a hot water heater tank made of carbon steel which comprises a central cylindrical section 1 closed at its ends by a pair of substantially cup-shaped or convex heads 2 which are welded thereto. Cylinder 1 and heads 2 may be formed from metal stock in any suitable way.

The first step in the method is to coat the interior of cylinder 1 and heads 2 with a glass material 3 suitable for use in preventing corrosion. This is done by spraying slip on the proper surfaces, as shown in Fig. 1. The separate tank components are then placed in a furnace 4 and fired to produce the necessary bond between the glass and the metal. The firing temperature will depend upon the characteristics of the glass used and is usually about 1600° F.

Figure 5:
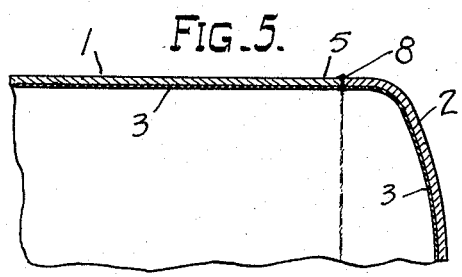
Fig. 5 is an enlarged fragmentary longitudinal section through the vessel, showing the completed joint.

Subsequent to firing, the components are positioned by any suitable apparatus, not shown, in preparation for welding with the edge of head 2 butted against the adjacent edge 5 of cylinder 1 as seen in Fig. 5. If desired, heads 2 may be joined to cylinder 1 by tack welds 6 to properly position them prior to heating and final welding. The entire circumferential edge of one head 2 and the adjacent edge 5 of cylinder 1 are then pre-heated by an electric induction heater 7 or the like.

Figure 4:
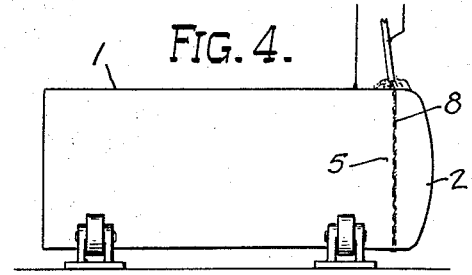
Fig. 4 is a view similar to Fig. 3 and showing the final welding step.

Once the parts have been heated to the proper temperature, a circumferential arc weld 8 is made around the outside of the heated seam to weld the parts together, as shown in Fig. 4. It has been found that submerged arc welding is suitable for this purpose.

Similarly, the other head 2 is joined to the other end of cylinder 1.

By pre-heating the areas adjacent the edges to be welded, cracking or crazing of the inner lining along the seam is avoided and a smooth fused ceramic-covered joint will be formed which will adequately protect the vessel from corrosion.

The pre-heat temperature is important and must be carefully regulated. If the edges are not heated to a high enough temperature, the glass will not soften enough and the stresses will not be removed from the glass and it will crack. The glass must be heated above its stress point which is the temperature above which there will be no stresses in the glass. On the other hand, if the preheat temperature is too high, the ceramic lining will burn away from the edges during welding, leaving a broken and exposed joint. This burning away is characterized by iron oxide from the base metal which goes into solution and finally crystallizes in the completed weld.

For example, it has been found that with sodium aluminum borosilicate glass coatings having a stress point at about 1000° F. and which fire at approximately 1600° F., the pre-heating temperature should be kept within the range of 1000° F. to 1200° F. If the heating temperature is below 1000° F. the glass will crack during welding, and if the temperature exceeds 1200° F. the joint will be left exposed. But within that range, a very smooth joint is obtained in the vessel and the joint does not have any cracks. The actual firing temperature of a particular glass may vary 50° in either direction, depending upon the speed of firing.

If a glass is used which has a firing temperature above or below 1600° F., the necessary pre-heat range would be increased or decreased accordingly. It is also important that the entire circumference of the sections be heated uniformly to the proper softening temperature. Otherwise the lining will crack due to thermal stresses. It is only necessary to pre-heat the metal adjacent the edges to be welded, although each entire piece may be heated if desired.

Figure 6:
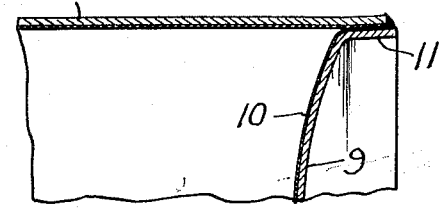
Fig. 6 is a view similar to Fig. 5 and showing another tank construction.
Figure 7:
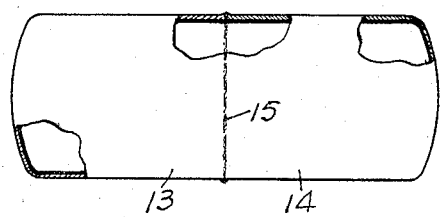
Fig. 7 is a side elevation of still another type of tank constructed in accordance with the invention and with parts broken away.

Fig. 6 shows another type of tank construction which may be made by the method of the present invention. In this instance, a concave head 9 is coated with enamel 10 on its inner surface. The circumferential edges 11 of head 9 and a lined cylinder 12 are then pre-heated. Head 9 is then placed in overlapping relationship with cylinder 12 and the two are welded together at the outer ends as shown in Fig. 6. The method of the invention may also be utilized in the manufacture of lined hot water heater tanks made from two U-shaped closed end sections 13 and 14 joined together at the center of the vessel by a single circumferential weld 15, as shown in Fig. 7. The edges of sections 13 and 14 approaching joint 15 are heated as described with respect to the heads 2 and cylinder 1, one of such sections corresponding to cylinder 1 and the other to one of the heads 2.

The invention presents a novel method of forming a cylindrical tank made from several components and which is lined on the inside with glass or the like. The proper pre-heating of the circumferential edges produces a final product which is substantially free from defects in the glass on the interior of the welded seam.

The method may be used successfully to join glass coated members having other shapes than the cylindrical tank described and shown in the drawing.

Various modes of carrying out the invention are contemplated as within the scope of the accompanying claims which particularly point out and distinctly claim the subject matter regarded as the invention.

I claim:

1. In the method of manufacture of a composite metal article wherein the parts of said article are finally joined together by welding, the steps comprising coating a surface of each part with glass material, firing said parts to bond the glass coating material thereto, subsequently heating said fired parts uniformly adjacent the portions thereof to be joined to a temperature above the stress point of the glass material to prevent thermal cracking of said material adjacent the joint during welding but below the point at which said material will burn away at the joint during welding, and finally joining the heated portions of said metal members by arc welding.

2. The method according to claim 1 in which the glass material has a firing temperature of approximately 1600° F., the stress point above which substantially no cracking occurs being 1000° F., and the heating temperature below which the glass does not burn away being about 1200° F.

3. In the method of manufacture of a carbon steel tank wherein the circumferential edge portions of the tank components are finally joined together by welding, the steps comprising coating the inner surface of each component with glass material, firing said components to bond the coating to the metal, subsequently heating the fired components adjacent their circumferential edges uniformly and to a temperature high enough to prevent cracking of the glass material during welding but low enough to prevent said material from burning away from said edges during welding, and then arc welding said components together along the heated edge portions from the outside.

4. In the method of manufacture of a cylindrical glass lined carbon steel tank wherein the circumferential edge portions of glass lined tank components are finally joined together by welding, the steps comprising pre-heating said components adjacent their edge portions uniformly and prior to welding to a temperature above the stress point of the glass material to prevent cracking of said material adjacent the finished joint during welding but below the point at which said material will burn away from the edge portions during welding, and subsequently arc welding said components together while the latter are at substantially the preheated temperature.

5. The method according to claim 4 in which the glass material has a firing temperature of approximately 1600° F., the stress point above which substantially no cracking occurs being 1000° F., and the heating temperature below which the glass does not burn away being about 1200° F.

References Cited in the file of this patent

UNITED STATES PATENTS

| | | |
|---|---|---|
| 1,673,653 | Wagner | June 12, 1928 |
| 2,184,534 | Smith et al. | Dec. 26, 1939 |
| 2,263,021 | Uecker | Nov. 18, 1941 |
| 2,302,563 | Masters | Nov. 17, 1942 |
| 2,401,231 | Crawford | May 28, 1946 |
| 2,697,311 | Polan | Dec. 21, 1954 |
| 2,716,690 | Lund | Aug. 30, 1955 |